(12) United States Patent
Kwon et al.

(10) Patent No.: US 10,014,135 B2
(45) Date of Patent: Jul. 3, 2018

(54) KNOB ASSEMBLY AND KNOB CONTROL SYSTEM FOR VEHICLE INCLUDING THE SAME

(71) Applicant: HYUNDAI MOTOR COMPANY, Seoul (KR)

(72) Inventors: Gideok Kwon, Seoul (KR); Sung Un Kim, Yongin-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 509 days.

(21) Appl. No.: 14/826,589

(22) Filed: Aug. 14, 2015

(65) Prior Publication Data

US 2016/0118207 A1 Apr. 28, 2016

(30) Foreign Application Priority Data

Oct. 22, 2014 (KR) .......................... 10-2014-0143297

(51) Int. Cl.
*H01H 19/14* (2006.01)
*G05G 1/08* (2006.01)
*H01H 19/11* (2006.01)

(52) U.S. Cl.
CPC .............. *H01H 19/14* (2013.01); *G05G 1/08* (2013.01); *H01H 19/11* (2013.01)

(58) Field of Classification Search
CPC ........... H01H 19/14; H01H 19/11; G05G 1/08
USPC ........................................................ 307/9.1
See application file for complete search history.

(56) References Cited

U.S. PATENT DOCUMENTS

| 7,038,667 | B1 | 5/2006 | Vassallo et al. |
| 7,395,081 | B2 | 7/2008 | Bonnelykke Kristensen et al. |
| 2008/0011590 | A1* | 1/2008 | Montalvo ................ G05G 1/08 200/11 R |
| 2008/0197004 | A1* | 8/2008 | Ishigaki ................. B60K 37/06 200/336 |
| 2014/0116181 | A1* | 5/2014 | Yamada ............... B60H 1/0065 74/480 R |
| 2015/0053043 | A1* | 2/2015 | Livolsi ..................... G05G 1/12 74/553 |
| 2015/0253750 | A1* | 9/2015 | Eronen .................. G05B 15/02 700/12 |

FOREIGN PATENT DOCUMENTS

| JP | 2560473 Y2 | 1/1998 |
| JP | 2582824 Y2 | 10/1998 |
| JP | 2011-238447 A | 11/2011 |
| KR | 10-0461160 B1 | 12/2004 |

* cited by examiner

*Primary Examiner* — Jared Fureman
*Assistant Examiner* — Win Htun
(74) *Attorney, Agent, or Firm* — McDermott Will & Emery LLP (57) ABSTRACT

A knob assembly includes a head portion and a cylindrical-shaped protruding portion protruding from one surface of the head portion. The protruding portion is interlocked with and configured to rotate together with the head portion. A plurality of friction protrusions are disposed along an exterior circumference of the protruding portion and configured to generate friction sound patterns by sequentially rubbing an external protrusion as the head portion rotates. A fixing member is coupled to the protruding portion in an opposite direction of the head portion.

20 Claims, 10 Drawing Sheets

KNOB ASSEMBLY AND KNOB CONTROL SYSTEM FOR VEHICLE INCLUDING THE SAME

CROSS-REFERENCE TO RELATED APPLICATION

This application claims the benefit of priority to Korean Patent Application No. 10-2014-0143297 filed in the Korean Intellectual Property Office on Oct. 22, 2014, the entire contents of which are incorporated herein by reference.

TECHNICAL FIELD

The present disclosure relates to a knob assembly that is robust against an external environment, and a knob control system for a vehicle including the same.

BACKGROUND

Manipulation means for controlling various electronic equipment such as an air conditioning apparatus are provided within a vehicle. A knob is a rotation type of input device that can be manipulated with a simple operation of grasping and rotating it, and is a representative manipulation means within a vehicle.

Research for applying a touch screen of a curved surface to electronic equipment that is mounted within a vehicle such as at a center fascia has been actively performed, and ongoing research for coupling a manipulation means such as a knob to the touch screen is also being actively undertaken.

Conventionally, a method of coupling an optical knob to a touch screen has been suggested. The optical knob includes a specific pattern rotating in conjunction with rotation of the knob at a rear surface of the knob, and a knob control system for a vehicle may recognize a control input from an image of the specific pattern. That is, as the optical knob rotates, a pattern of the rear surface of the knob rotates and thus a change occurs in a pattern image. Such a pattern change is converted to a rotation amount and rotating direction of the knob by the knob control system, and the knob control system may select a control input to correspond to the rotation amount and the rotating direction of the knob.

Such an optical knob does not require installation of separate wiring in order to transfer a control input according to a manipulation of the knob to a control system and may thus be easily coupled to touch screens of various designs, but erroneous pattern recognition occurs by light disturbance such as sunlight and thus there is a problem that a malfunction occurs.

The above information disclosed in this Background section is only for enhancement of understanding of the background of the invention and therefore it may contain information that does not form the prior art that is already known in this country to a person of ordinary skill in the art.

SUMMARY

Embodiments of the present invention have been made in an effort to provide a knob assembly and a knob control system for a vehicle including the same having advantages of not requiring separate wiring and that is robust against the external environment such as light disturbance.

An exemplary embodiment of the present invention provides a knob assembly including: a head portion and a cylindrical-shaped protruding portion protruding from one surface of the head portion. The protruding portion is interlocked with and is configured to rotate together with the head portion. A plurality of friction protrusions are disposed along an exterior circumference of the protruding portion and are configured to generate friction sound patterns by sequentially rubbing the external protrusion as the head portion rotates. The friction protrusions having edges shaped such that the friction sound patterns vary according to a rotation direction of the head portion. A fixing member is coupled to the protruding portion in an opposite direction of the head portion.

In certain embodiments, the protruding portion may be inserted into a penetration hole of a display, and the fixing member may prevent the protruding portion from separating from the penetration hole.

In certain embodiments, the external protrusion may be formed at an interior circumference of the penetration hole.

In certain embodiments, the friction protrusions may have different edge widths or different edge curvatures. In certain embodiments, in the plurality of friction protrusions, at least one of a center frequency, a frequency band, and a peak value may generate different friction sounds according to the edge width or the curvature.

In certain embodiments, each of the friction protrusions may have at least two friction protrusion portions, and the friction protrusion portions may have different edge widths or different curvatures. In certain embodiments, in the friction protrusion portions, at least one of a center frequency, a frequency band, and a peak value may generate different friction sounds according to the edge width or the curvature.

Another embodiment of the present invention provides a knob assembly including: a fixing member including at least one friction protrusion. A body includes a head portion; a cylindrical-shaped protruding portion protruding from one surface of the head portion and interlocked and configured to rotate together with the head portion. A plurality of body friction protrusions are disposed along an exterior circumference of the protruding portion and are configured to generate friction sound patterns by sequentially rubbing the friction protrusion of the fixing member as the head portion rotates. The body friction protrusions each has an edge shape such that the friction sound patterns vary according to a rotation direction of the head portion.

In certain embodiments, the protruding portion may be inserted into a penetration hole of a display and be coupled to the fixing member to rotate relative to the fixing member, and the fixing member may be fixed to the display to prevent the protruding portion from separating from the penetration hole.

Yet another embodiment of the present invention provides a knob control system for a vehicle, including: a knob including a head portion and a plurality of first friction protrusions that generate at least one friction sound pattern according to a rotation direction of the head portion; an audio sensor; and a controller configured to detect a rotation direction and a rotation amount of the head portion by analyzing the at least one friction sound pattern that is detected through the audio sensor and to recognize a control input based on the rotation direction and the rotation amount.

In certain embodiments, the plurality of first friction protrusions may have edges shaped such that the at least one friction sound pattern varies according to a rotation direction of the head portion.

In certain embodiments, the controller may detect an order in which the plurality of first friction protrusions generate friction sounds by analyzing the at least one friction sound pattern and detect the rotation direction based on the order. In certain embodiments, the controller may detect a peak value from the at least one friction sound pattern and detect the rotation amount according to a detection number of the peak value.

In certain embodiments, the knob may further include a cylindrical-shaped protruding portion protruding from one surface of the head portion, the protruding portion interlocked with and configured to rotate together with the head portion, and the plurality of first friction protrusions may be disposed along an exterior circumference of the protruding portion.

In certain embodiments, the knob may further include a fixing member including a second friction protrusion, and the plurality of first friction protrusions generate the at least one friction sound pattern by sequentially rubbing the second friction protrusions as the head rotates.

According to the foregoing exemplary embodiments of the present invention, by using a friction sound according to a rotation of a knob as a control input, when installing the knob, there is a merit that separate wiring for receiving a control input from the knob is not required. Further, as, in certain embodiments, the knob is free from the wiring, it can be coupled to displays of various designs.

In addition, in certain embodiments, a friction sound occurring in the knob can be distinguished from an audio signal occurring by other manipulation inputs such as knocking of a touch screen, and thus a knob that is robust against an external environment can be provided.

Further, expensive equipment such as a camera is not required in order to detect a control input according to a manipulation of a knob, and thus production cost can be reduced.

DETAILED DESCRIPTION

Embodiments of the present invention will be described more fully hereinafter with reference to the accompanying drawings. As those skilled in the art would realize, the described embodiments may be modified in various different ways, all without departing from the spirit or scope of the present invention.

The drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements.

Hereinafter, a knob assembly and a knob control system for a vehicle including the same according to exemplary embodiments of the present invention will be described with reference to necessary drawings.

Figure 1:
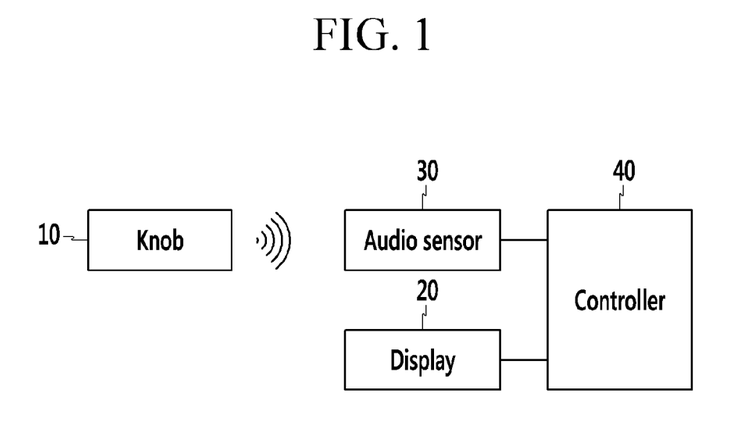
FIG. 1 is a block diagram illustrating a configuration of a knob control system for a vehicle according to exemplary embodiments of the present invention.
Figure 2:
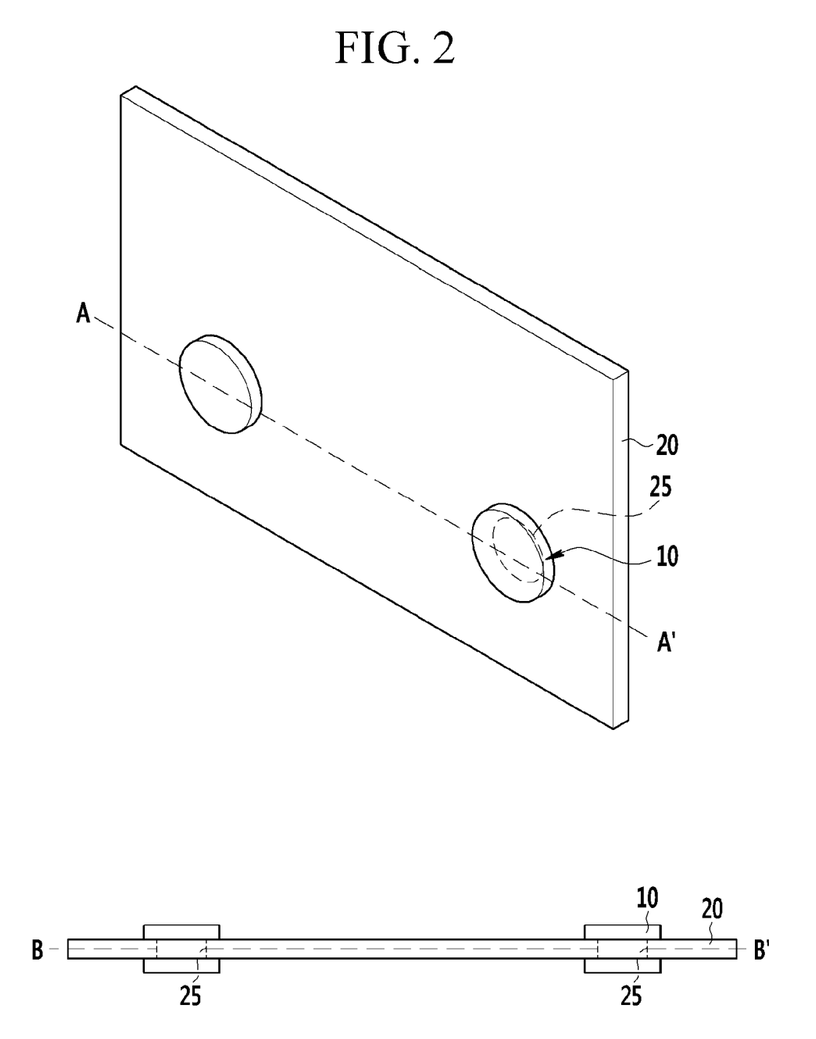
FIG. 2 is a diagram illustrating an example of coupling a knob assembly and a display in a knob control system for a vehicle according to exemplary embodiments of the present invention.

FIG. 1 is a block diagram illustrating a configuration of a knob control system for a vehicle according to exemplary embodiments of the present invention, and FIG. 2 is a diagram illustrating an example of coupling a knob assembly and a display in a knob control system for a vehicle according to exemplary embodiments of the present invention.

Referring to FIG. 1, a knob control system for a vehicle according to exemplary embodiments of the present invention may include a knob 10, a display 20, an audio sensor 30, and a controller 40.

The knob 10 is a rotation type of input device, and may include a plurality of friction protrusion portions (see reference numerals 310 and 320 of FIG. 6 and FIG. 10 to be described later) that generate a friction sound upon rotating.

The plurality of friction protrusion portions 310 and 320 that are included in the knob 10 rotate by interlocking with rotation of the knob 10, and may be designed to have a different friction sound pattern according to a rotation direction. An assembly structure of the knob 10 for generating a friction sound of different patterns according to a rotating direction will be described later in detail with reference to FIGS. 3 to 10.

The display 20 functions as an output device for displaying information that is processed in a control system for a vehicle. When the display 20 is coupled to a touch panel (not shown), the display 20 may function as an input device that receives a touch input in addition to an output device.

As shown in FIG. 2, in a partial area of the display 20, at least one knob 10 may be coupled. In this case, the display 20 may include a penetration hole 25 in which the knob 10 is inserted and coupled in a partial area thereof.

The audio sensor 30, may receive a friction sound occurring from the knob 10. When the knob 10 is coupled to the display 20, as shown in FIG. 2, the audio sensor 30 is coupled to an edge of the display 20 to receive a friction sound occurring in the knob 10.

The audio sensor 30 converts the received friction sound to an electrical signal, and outputs the electrical signal to the controller 40.

In certain embodiments, the audio sensor 30 may set a frequency band and an amplitude of an audio signal that can be received to correspond to a frequency band and an amplitude of the friction sound that is generated in the knob 10. For example, the audio sensor 30 may selectively detect only an audio signal that is included in a frequency band and an amplitude range of a friction sound that is generated in the knob 10 among audio signals that are input through a filter.

In certain embodiments, in order to generate a friction sound of a specific frequency band and an amplitude range, an edge shape of the friction protrusion portions 310 and 320 that generate a friction sound may be designed. For example, an edge shape of each of the friction protrusion portions 310 and 320 may be designed to generate a friction sound that deviates from a frequency band and an amplitude range of an audio signal that frequently occurs within a vehicle due to a factor such as a radio, conversation, music, and road noise.

In this way, an edge shape of each of the friction protrusion portions 310 and 320 is designed to generate a friction sound in a frequency band and an amplitude range that are distinguished from general noise within a vehicle, and when an audio signal that deviates from a frequency band and an amplitude range of a friction sound occurring in the knob 10 through the audio sensor 30 is previously blocked, in a process of recognizing a friction sound of the knob 10 as a control input, a robustness against external noise can be secured.

In certain embodiments, the controller 40 may analyze an electrical signal that is output from the audio sensor 30 and determine a rotating direction and a rotation amount of the knob 10. The knob 10 generates friction sounds of different patterns according to a rotating direction. Therefore, by analyzing a pattern of a friction sound that is acquired through the audio sensor 30, the controller 40 may determine a rotating direction and a rotation amount of the knob 10.

In certain embodiments, when detecting a rotating direction and a rotation amount of the knob 10, the controller 40 may recognize a control input to correspond thereto and may perform a corresponding function based on the control input that has occurred by a rotation of the knob 10, or may control information that is displayed in the display 20.

Hereinafter, a knob assembly according to a first exemplary embodiment of the present invention will be described with reference to FIGS. 3 to 6.

According to a first exemplary embodiment of the present invention, in a knob assembly, friction protrusion portions rub a friction protrusion that is formed in a display to generate a friction sound.

Figure 3:
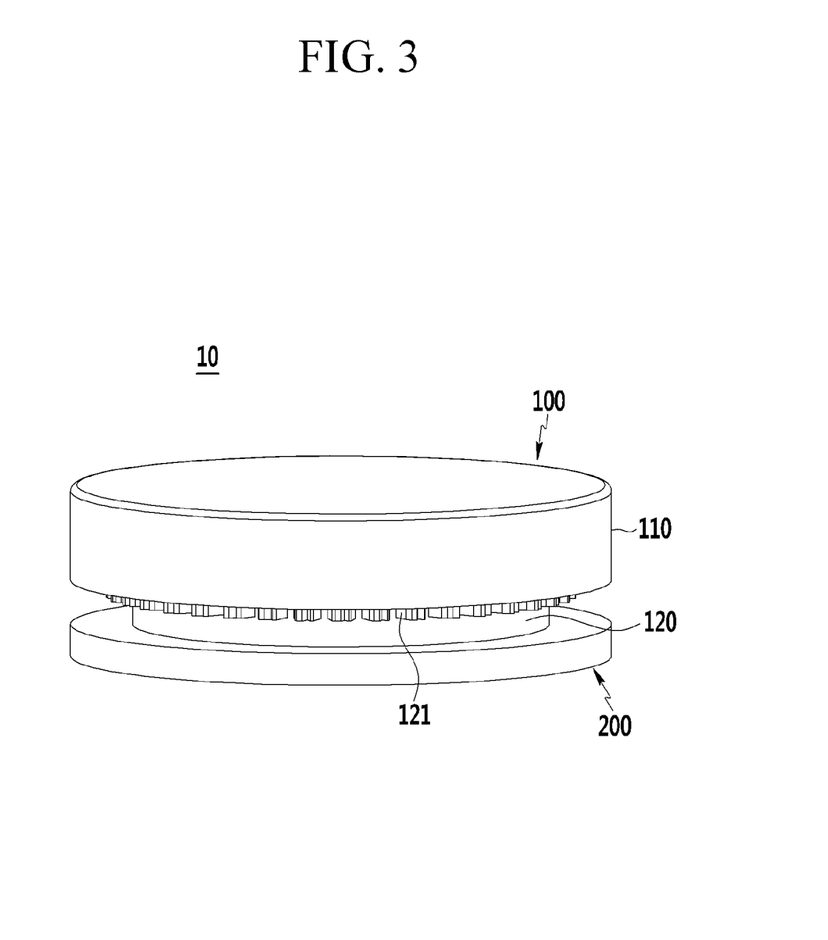
FIG. 3 is a perspective view illustrating a knob assembly according to a first exemplary embodiment of the present invention.
Figure 4:
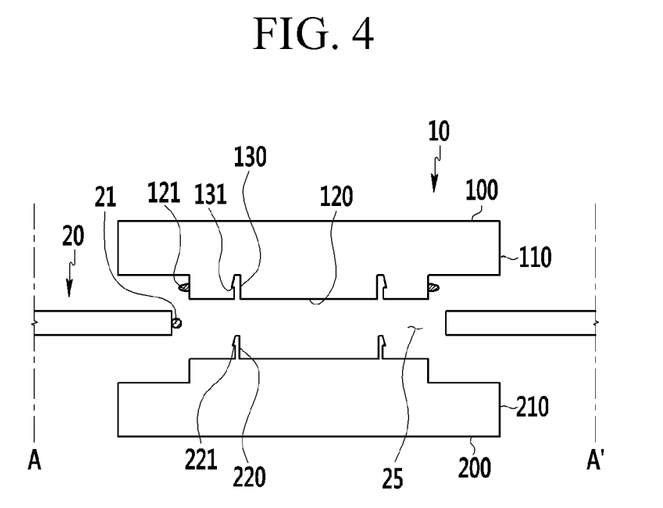
FIGS. 4 and 5 are cross-sectional views illustrating a knob assembly taken along different directions according to a first exemplary embodiment of the present invention.
Figure 5:
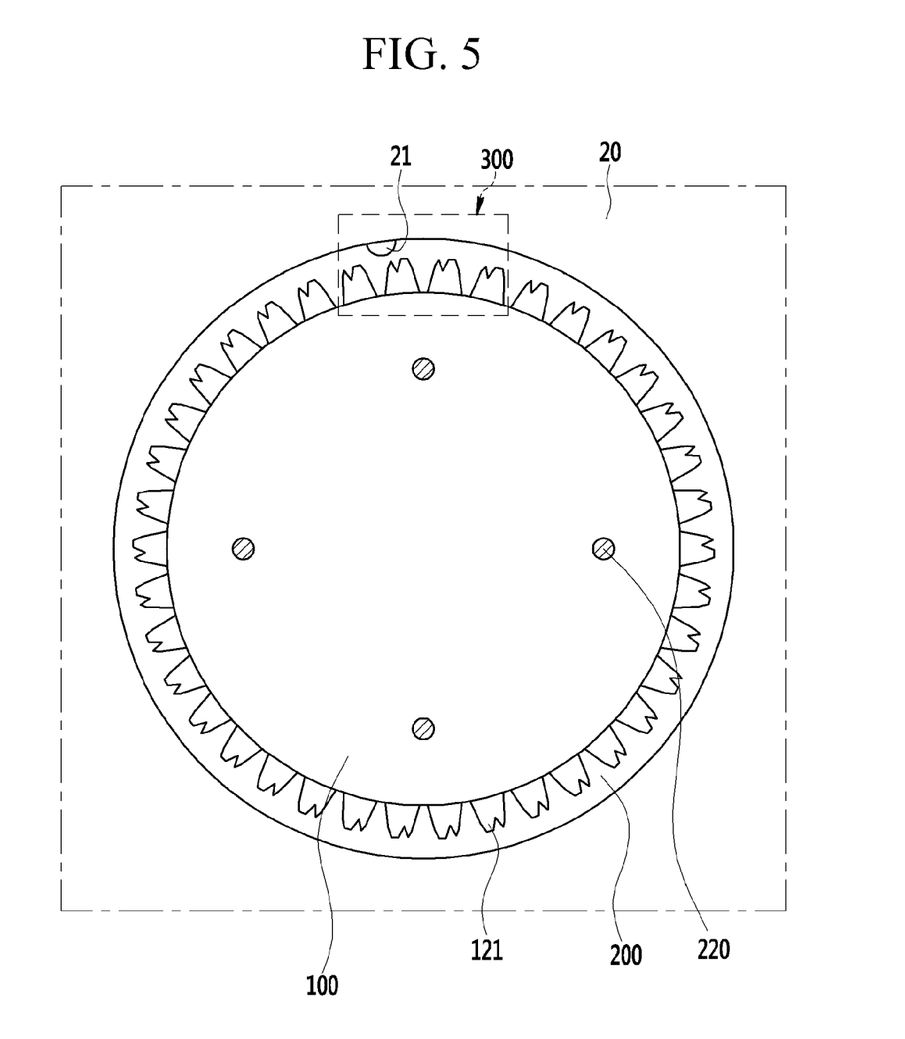
Figure 6:
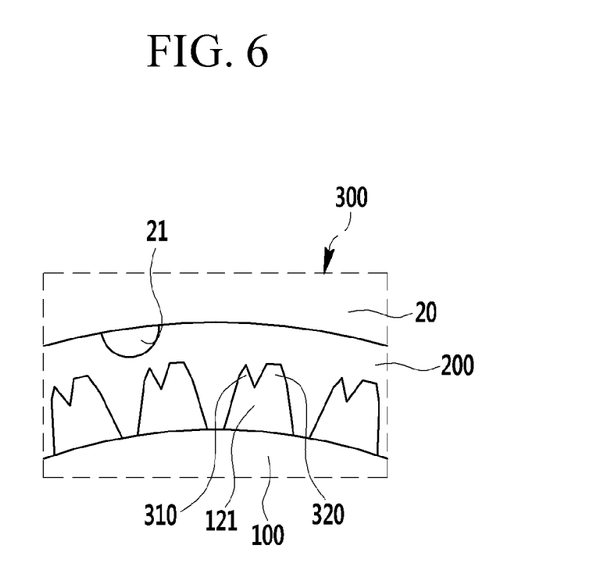
FIG. 6 is a partially enlarged view of FIG. 5.

FIG. 3 is a perspective view illustrating a knob assembly according to a first exemplary embodiment of the present invention. Further, FIGS. 4 and 5 are cross-sectional views illustrating a knob assembly taken along different directions according to the first exemplary embodiment of the present invention, and are cross-sectional views taken along lines A-A' and B-B', respectively, of FIG. 2. Further, FIG. 6 is a partially enlarged view of section 300 in FIG. 5.

Referring to FIGS. 3 to 6, an assembly of the knob 10 according to a first exemplary embodiment of the present invention may include a body 100 and a fixing member 200 that prevents the body 100 from separating by being coupled to the body 100.

Further, in certain embodiments, the body 100 may include a head portion 110 of a handle form, a protruding portion 120 that is protruded from one surface of the head portion 110, and a plurality of friction protrusions 121 that are disposed along an exterior circumferential surface of the protruding portion 120.

In certain embodiments, the head portion 110 may perform a handle function for user manipulation. As shown in FIG. 2, when the knob 10 is coupled to the display 20, the head portion 110 is exposed at a front surface of the display 20 to be rotation-manipulated by a user.

The protruding portion 120 has a cylindrical shape and rotates by interlocking with a rotation movement of the head portion 110. In certain embodiments, as shown in FIG. 2, when the knob 10 is coupled to the display 20, the protruding portion 120 is inserted into a penetration hole 25 that is formed in the display 20, and an exterior circumference thereof may be enclosed by an interior circumference of the penetration hole 25.

In certain embodiments, each friction protrusion 121 may include a plurality of friction protrusion portions (see reference numerals 310 and 320 of FIG. 6) in an end portion. As the protruding portion 120 rotates by interlocking with rotation of the head portion 110, the plurality of friction protrusion portions 310 and 320 that are formed in an end portion of each friction protrusion 121 may generate a friction sound by sequentially rubbing with an external protrusion 21.

For example, when the knob 10 couples to the display 20, a plurality of friction protrusion portions 310 and 320 may generate a friction sound by sequentially rubbing with an external friction protrusion 21 (see FIG. 4) that is formed in the display 20.

A friction sound occurring when the plurality of friction protrusion portions 310 and 320 rub with the external protrusion 21 may be input into the audio sensor 30.

According to a first exemplary embodiment of the present invention, the plurality of friction protrusion portions 310 and 320 may generate a friction sound of different patterns according to a rotating direction of the head portion 110 so that a control system for a vehicle recognizes a rotating direction of the head portion 110 with a friction sound that is generated by the friction protrusion portions 310 and 320.

For this reason, in the plurality of friction protrusion portions 310 and 320 that are formed in an end portion of each friction protrusion 121, an edge shape thereof may be differently formed. Here, an edge shape is determined by an edge width and an edge curvature. That is, a plurality of friction protrusion portions 310 and 320 that are formed in an end portion of each friction protrusion 121 may be designed to have differently formed edge widths and edge curvatures.

An edge shape of each of the friction protrusion portions 310 and 320 may have an influence on a friction sound pattern including a center frequency, a frequency bandwidth, and an amplitude range (including a peak value).

For example, when an edge of the friction protrusion portions 310 and 320 is sharply designed, the friction protrusion portions 310 and 320 may generate a frequency signal in which a center frequency increases and having a small frequency band as a friction sound. Therefore, a plurality of friction protrusion portions 310 and 320 in which an edge shape is different may generate a frequency signal in which a center frequency, a frequency bandwidth, and an amplitude range are different as a friction sound.

Accordingly, as described above, when edge shapes of the plurality of adjacent friction protrusion portions 310 and 320 are different, an order in which each of the friction protrusion portions 310 and 320 rubs the external protrusion 21 is changed according to a rotating direction of the head portion 110, and thus a friction sound of different patterns may occur according to a rotating direction.

For example, in FIG. 6, when the head portion 110 rotates to the left side, the friction protrusion 310 having a relatively sharp edge shape rubs an external friction protrusion 21 earlier than the friction protrusion 320 having a relatively dull edge shape. Accordingly, a frequency signal having a small frequency band occurs as a friction sound by the friction protrusion 310 having a sharp edge shape, and thereafter, a frequency signal having a relatively large frequency band occurs as a friction sound by the friction protrusion 320 having a dull edge shape.

However, in certain embodiments, when the head portion 110 rotates to the right side, the friction protrusion 320 having a relatively dull edge shape rubs the external friction protrusion 21 earlier than the friction protrusion 310 having a relatively sharp edge shape. Therefore, after a frequency signal having a wide frequency band has occurred as a friction sound by the friction protrusion 320 having a dull edge shape, a frequency signal of a relatively small frequency band occurs as a friction sound by the friction protrusion 310 having a sharp edge shape.

As described above, in certain embodiments, as the plurality of friction protrusion portions 310 and 320 produce a friction sound of different patterns according to a rotating direction, the controller 40 may analyze the friction sound to recognize a rotating direction of the head portion 110. That is, the controller 40 may detect a frequency signal corresponding to each of the friction protrusion portions 310 and 320 from a friction sound continuously occurring by a plurality of friction protrusion portions 310 and 320 and recognize a rotating direction of the head portion 110 according to detection order of a frequency signal that each of the friction protrusion portions 310 and 320 produces.

In certain embodiments, the controller 40 may detect a peak value from a friction sound produced by the friction protrusion portions 310 and 320, and detect a rotation amount of the head portion 110 based on the peak value detection number. As shown in FIG. 6, when one friction protrusion 121 includes two friction protrusion portions 310 and 320, whenever the head portion 110 rotates by one friction protrusion 121, two peak values may be detected. Therefore, the controller 40 can detect a rotation amount of the head portion 110 according to the number of peak values that are detected from a friction sound.

When the display 20 is a touch screen, in order to use a friction sound produced by the knob 10 as a user input, an audio signal occurring in the display 20 due to a touch manipulation such as knocking and a friction sound occurring in the knob 10 should be distinguished.

As described above, in certain embodiments, when the plurality of friction protrusion portions 310 and 320 having different edge shapes continuously rub the external friction protrusion 21, a plurality of audio signals (friction sound) having different center frequencies continuously occur. Further, when a gap between the plurality of friction protrusion portions 310 and 320 is designed to be small, an audio signal (friction sound) having a short gap between peaks may occur, compared with a gap between peaks of an audio signal occurring with a touch manipulation such as knocking.

In certain embodiments, the controller 40 can distinguish a friction sound and an audio signal due to a touch manipulation based on a center frequency and a gap between peaks of an audio signal that is input through the audio sensor 30.

In certain embodiments, as shown in FIG. 2, when a control system for a vehicle includes a plurality of knobs 10, an edge shape of the friction protrusion portions 310 and 320 constituting each knob 10 may be designed to generate different friction sounds.

For example, when an edge shape of the friction protrusion portions 310 and 320 that are included in the first knob 10 generates a friction sound in which a center frequency is 2000 Hz and in which a peak value is 40 dB, and a friction sound in which a center frequency is 3000 Hz and in which a peak value is 45 dB, an edge shape of the friction protrusion portions 310 and 320 that are included in the second knob 10 may be designed to generate a friction sound in which a center frequency is 2500 Hz and in which a peak value is 43 dB and a friction sound in which a center frequency is 3500 Hz and in which a peak value is 38 dB.

In certain embodiments, when a friction sound occurs, by analyzing a friction sound pattern including a center frequency, an amplitude range, and a frequency bandwidth, the controller 40 may determine whether the friction sound is a friction sound that has occurred in which knob.

In certain embodiments, in the knob assembly, the fixing member 200 may perform a function of preventing the body 100 of the knob 10 from separating from the display 20, and may perform a function of guiding a location of the friction protrusion portions 310 and 320 so that the friction protrusion portions 310 and 320 contact the friction protrusion 21 of the outside.

In certain embodiments, the fixing member 200 may include a stopper 210 and at least one engaging protrusion 230 that is formed at one surface of the stopper 210.

In certain embodiments, by coupling to the protruding portion 120 in an opposite direction of the head portion 110, the stopper 210 prevents the protruding portion 120 from separating in an opposite direction of an insertion direction from a penetration hole 25. For this reason, it may be preferable, in certain embodiments, to form a width of the stopper 210 to be larger than a diameter of a penetration hole 25 in which the protruding portion 120 is inserted.

In certain embodiments, the engaging protrusion 220 is inserted into an engaging groove 130 that is formed in an end portion of the protruding portion 120 to perform a function of coupling the fixing member 200 to the body 100.

In certain embodiments, the engaging protrusion 220 and the engaging groove 130 include latch jaws 221 and 131, respectively, and the engaging protrusion 220 may be prevented from separating from the engaging groove 130 by the latch jaws 221 and 131.

FIG. 4 illustrates a case in which the body 100 and the fixing member 200 are coupled by the engaging protrusion 220 and the engaging groove 130 in the knob assembly, but this is merely an exemplary embodiment of the present invention and the present invention is not limited thereto. According to another exemplary embodiment of the present, the body 100 may be coupled to the fixing member 200 with various methods such as screw coupling.

Further, a first exemplary embodiment of the present invention illustrates a case in which the friction protrusion portions 310 and 320 in which edge shapes are differently formed to generate different friction sounds are provided in the knob 10, but the present invention is not limited thereto. According to another exemplary embodiment of the present invention, friction protrusion portions in which edge shapes are differently formed to generate different friction sounds are formed in the display 20, and a friction protrusion of a single shape that generates a friction sound by rubbing with the display 20 may be formed in the body 100 of the knob 10.

Hereinafter, a knob assembly according to a second exemplary embodiment of the present invention will be described with reference to FIGS. 7 to 10.

According to a second exemplary embodiment of the present invention, in a knob assembly, friction protrusion portions that are formed in a body may rub a friction protrusion that is formed in a fixing member to generate a friction sound.

Figure 7:
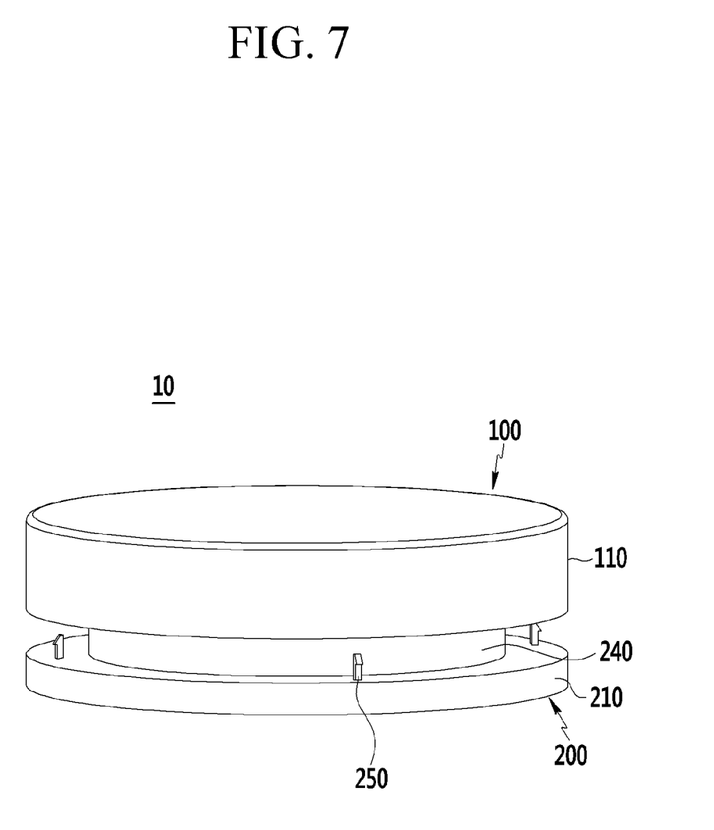
FIG. 7 is a perspective view illustrating a knob assembly according to a second exemplary embodiment of the present invention.
Figure 8:
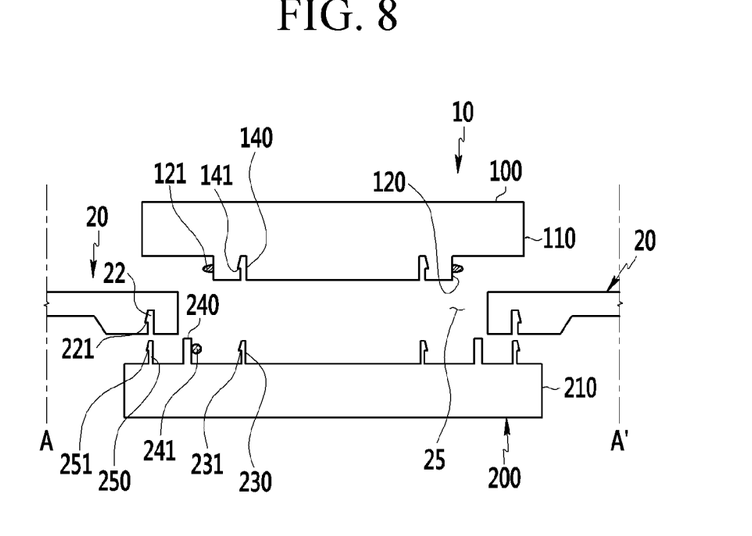
FIGS. 8 and 9 are cross-sectional views illustrating a knob assembly taken along different directions according to a second exemplary embodiment of the present invention.
Figure 9:
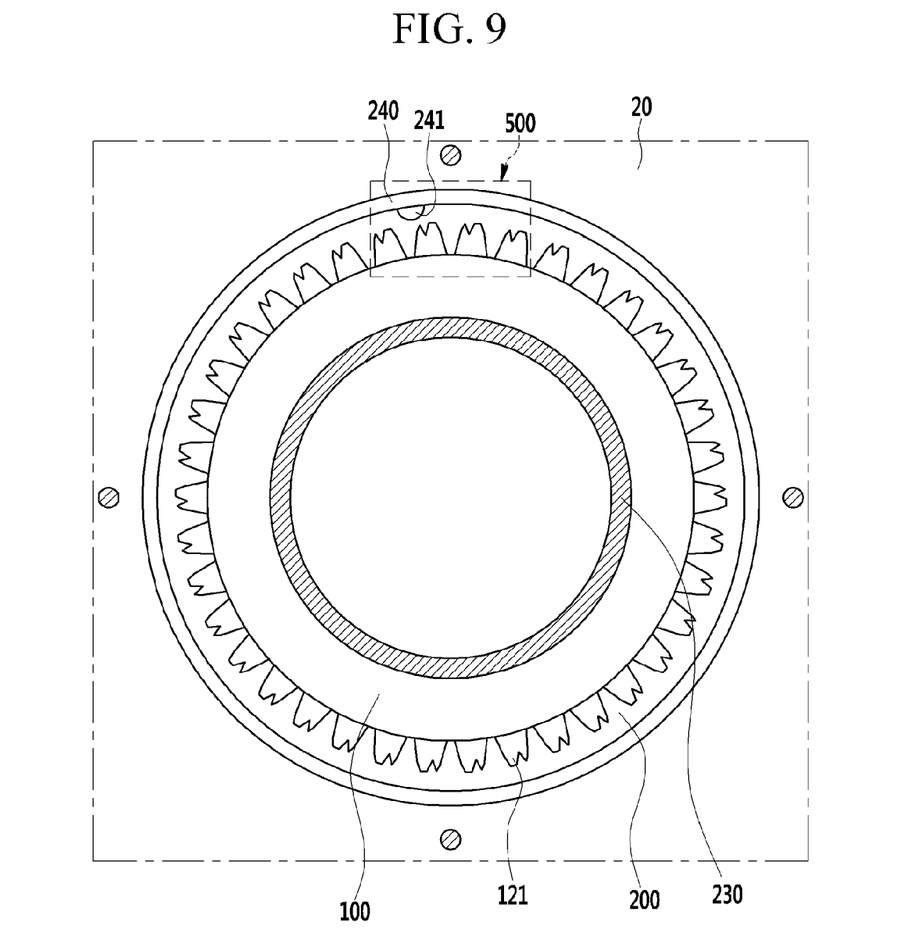
Figure 10:
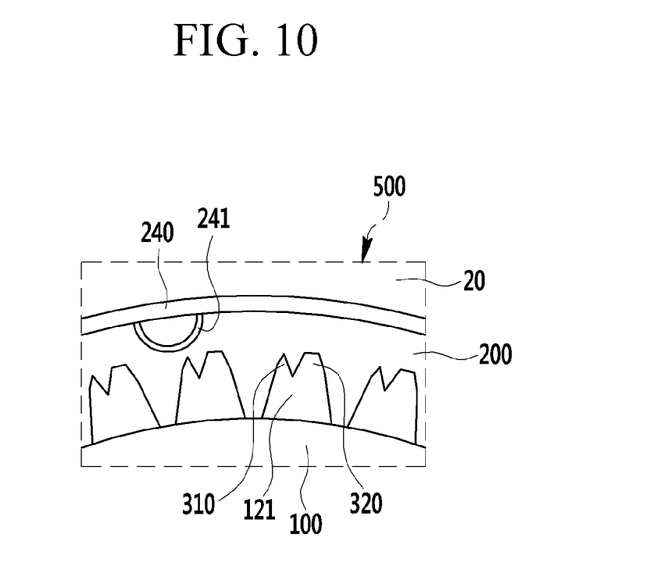
FIG. 10 is a partially enlarged view of FIG. 9.

FIG. 7 is a perspective view illustrating a knob assembly according to a second exemplary embodiment of the present invention. Further, FIGS. 8 and 9 are cross-sectional views illustrating a knob assembly taken along different directions according to a second exemplary embodiment of the present invention, and are cross-sectional views taken along lines A-A' and B-B', respectively, of FIG. 2. Further, FIG. 10 is a partially enlarged view of section 500 FIG. 9.

In the following description, a detailed description of the same constituent elements as or constituent elements similar to those of a knob assembly according to the first exemplary embodiment of the present invention that is described with reference to FIGS. 3 to 6 will be omitted.

Referring to FIGS. 7 to 10, in certain embodiments, an assembly of a knob 10 according to a second exemplary embodiment of the present invention may include a body 100 and a fixing member 200 that prevents the body 100 from separating by being coupled to the body 100.

Further, to certain embodiments, the body 100 may include a head portion 110 of a handle form, a cylindrical-shaped protruding portion 120 that is protruded from one surface of the head portion 110, and a plurality of friction protrusions 121 that are disposed along an exterior circumference of the protruding portion 120.

In certain embodiments, the head portion 110 may perform a handle function of enabling a user to perform a rotation manipulation. As shown in FIG. 2, when the knob 10 is coupled to the display 20, the head portion 110 is exposed at a front surface of the display 20 to be rotation-manipulated by the user.

In certain embodiments, the protruding portion 120 has a cylindrical shape and rotates by interlocking with a rotation movement of the head portion 110. As shown in FIG. 2, when the knob 10 is coupled to the display 20, the protruding portion 120 is inserted into a penetration hole 25 that is formed in the display 20, and an exterior circumference thereof may be enclosed by an interior circumference of the penetration hole 25.

In certain embodiments, each friction protrusion 121 may include a plurality of friction protrusion portions (see reference numerals 310 and 320 of FIG. 10) in an end portion. As the protruding portion 120 rotates by interlocking with a rotation of the head portion 110, a plurality of friction protrusion portions 310 and 320 that are formed in an end portion of each friction protrusion 121 may generate a friction sound by sequentially rubbing with a friction protrusion 241 that is formed in a fixing member 200.

In certain embodiments, a friction sound occurring when the plurality of friction protrusion portions 310 and 320 rub the friction protrusion 241 that is formed in the fixing member 200 may be input to the audio sensor 30.

In certain embodiments, the plurality of friction protrusion portions 310 and 320 may generate a friction sound of different patterns according to a rotating direction of the head portion 110 so that a control system for a vehicle recognizes a rotating direction of the head portion 110 with a friction sound generated by the friction protrusion portions 310 and 320.

For this reason, in certain embodiments, in the plurality of friction protrusion portions 310 and 320 that are formed in an end portion of each friction protrusion 121, an edge shape thereof may be differently formed to generate different friction sounds. Accordingly, the controller 40 may separate a friction sound that is generated by each of the friction protrusion portions 310 and 320 from other friction sounds, and may recognize a rotating direction of the head portion 110 according to an order in which friction sounds occur.

Further, in certain embodiments, the controller 40 may detect a peak value from a friction sound occurring by the friction protrusion portions 310 and 320 and detect a rotation amount of the head portion 110 based on the peak value detection number.

In certain embodiments, in the knob assembly, the fixing member 200 may rotatably support the body 100 of the knob 10 and prevent the body 100 of the knob 10 from separating from the display 20.

For this reason, in certain embodiments, the fixing member 200 may include a stopper 210 and at least one engaging protrusion 230 that is formed at one surface of the stopper 210.

In certain embodiments, the stopper 210 is coupled to the protruding portion 120 in an opposite direction of the head portion 110, and a width thereof may be formed larger than a diameter of a penetration hole 25 into which the protruding portion 120 is inserted. Accordingly, the stopper 210 may prevent the protruding portion 120 from separating in an opposite direction of an insertion direction from the penetration hole 25.

In certain embodiments, the engaging protrusion 230 is inserted into an engaging groove 140 that is formed in an end portion of the protruding portion 120 to perform a function of coupling the body 100 to the fixing member 200. The engaging protrusion 230 and the engaging groove 140 include latch jaws 231 and 141, respectively, and when the engaging protrusion 230 and the engaging groove 140 are engaged by the latch jaws 231 and 141, respectively, the engaging protrusion 230 and the engaging groove 140 are prevented from being separated.

In the knob assembly, in certain embodiments, as the body 100 of the knob 10 rotates, the fixing member 200 may sequentially rub the friction protrusion portions 310 and 320 to generate a friction sound.

For this reason, in certain embodiments, the fixing member 200 may include a friction protrusion 241. The friction protrusion 241 that is formed in the fixing member 200 is disposed opposite to an exterior circumference of the protruding portion 120, and a location thereof may be determined to contact the friction protrusion portions 310 and 320 that are formed in the body 100.

In certain embodiments, a location of the friction protrusion 241 may be guided by a support unit 240 that is protruded from one surface of the fixing member 200, and the friction protrusion 241 may be supported so that the friction protrusion 241 of the fixing member 200 sequentially rubs friction protrusion portions 310 and 320 that are formed in the body 100. In certain embodiments, there may be a single friction protrusion 241 on the fixing member 200. In other embodiments, there may be a plurality of friction protrusions 241 on the fixing member 200. In these embodiments, a single friction protrusion 121 having friction protrusion portions 310 and 320 may sequentially rub against each friction protrusion 241 of the fixing member 200 as the head portion 110 of the body 100 rotates.

In certain embodiments, in order for the friction protrusion portions 310, 320, and friction protrusion 241 that are formed in the body 100 and the fixing member 200 to generate a friction sound by rubbing, it may be necessary to couple the body 100 to the fixing member 200 so that the body 100 rotates in a fixed state.

For this reason, in certain embodiments, the engaging groove 140 for coupling the body 100 and the fixing member 200 may be formed in a ring shape. Accordingly, even if the engaging protrusion 230 is engaged with the engaging groove 140, a rotation movement of the body 100 may be performed.

FIG. 8 illustrates a case in which the body 100 and the fixing member 200 are coupled by the engaging protrusion 230 and the engaging groove 140, but this is merely an exemplary embodiment of the present invention and the present invention is not limited thereto. The body 100 may be coupled to the fixing member 200 to rotate by various methods.

In certain embodiments, it may be necessary to fix a location of the fixing member 200 to not rotate by interlocking with a rotation of the body 100.

For this reason, in certain embodiments, the fixing member 200 may further include a fixing protrusion 250. The fixing protrusion 250 is inserted into a fixing groove 22 of the display 20 to perform a function of fixing the fixing member 200 to the display 20. The fixing protrusion 250 and the fixing groove 22 include latch jaws 251 and 221, respectively, and when the fixing protrusion 250 and the fixing groove 22 are engaged by the latch jaws 251 and 221, respectively, separation of the fixing protrusion 250 and the fixing groove 22 is prevented.

FIG. 8 illustrates a case in which the fixing member 200 is coupled to the display 20 by the fixing protrusion 250 and the fixing groove 22, but this is merely an exemplary embodiment of the present invention and the present invention is not limited thereto. The fixing member 200 may be fixed to the display 20 with various methods.

Further, a second exemplary embodiment of the present invention illustrates a case in which the friction protrusion portions 310 and 320 of which edge shapes are differently formed to generate different friction sounds are provided in the body 100 of the knob 10, but the present invention is not limited thereto. According to another exemplary embodiment of the present invention, friction protrusion portions of which edge shapes are differently formed to generate different friction sounds are formed in the fixing member 200 of the knob 10, and a friction protrusion of a single shape that generates a friction sound by rubbing with the fixing member 200 may be formed in the body 100 of the knob 10.

According to the foregoing exemplary embodiments of the present invention, by using a friction sound according to a rotation of a knob as a control input, when installing the knob, there is a merit that separate wiring for receiving a control input from the knob is not required. Further, a knob is free from wiring and can be coupled to displays of various designs.

Further, in certain embodiments, a friction sound occurring in the knob can be distinguished from an audio signal occurring by other manipulation inputs such as knocking of a touch screen and thus a knob that is robust against an external environment can be provided.

Further, in certain embodiments, in order to detect a control input according to a manipulation of a knob, expensive equipment such as a camera is not required and thus a production cost can be reduced.

The foregoing drawings and a detailed description of embodiments of the invention are merely illustrative but are not used to limit meaning or for limiting the scope of the present invention described in the claims. Therefore, a person of ordinary skill in the art can easily select and replace from the foregoing drawings and the detailed description. Further, a person of ordinary skill in the art may omit some of constituent elements described in this specification without degradation of performance, or may add constituent elements in order to enhance performance. Further, a person of ordinary skill in the art may change order of method steps that are described in this specification according to a process environment or equipment. Therefore, the scope of the present invention should be determined by the appended claims and their equivalents, rather than described implementations.

While exemplary embodiments of this invention have been described above, it is to be understood that the invention is not limited to the disclosed embodiments, but, on the contrary, is intended to cover various modifications and equivalent arrangements included within the spirit and scope of the appended claims.

What is claimed is:

1. A knob assembly, comprising:
   a head portion;
   a cylindrical-shaped protruding portion protruding from one surface of the head portion, the protruding portion interlocked with and configured to rotate together with the head portion;
   a plurality of friction protrusions disposed along an exterior circumference of the protruding portion and configured to generate friction sound patterns by sequentially rubbing an external protrusion as the head portion rotates, the friction protrusions having edges shaped such that the friction sound patterns vary according to a rotation direction of the head portion ; and
   a fixing member coupled to the protruding portion in an opposite direction of the head portion.

2. The knob assembly of claim 1, wherein the protruding portion is inserted into a penetration hole of a display, and the fixing member prevents the protruding portion from separating from the penetration hole.

3. The knob assembly of claim 2, wherein the external protrusion is formed at an interior circumference of the penetration hole.

4. The knob assembly of claim 1, wherein the friction protrusions have different edge widths or different edge curvatures.

5. The knob assembly of claim 4, wherein, in the plurality of friction protrusions, at least one of a center frequency, a frequency band, and a peak value generates different friction sounds according to the edge width or the curvature.

6. The knob assembly of claim 1, wherein each of the friction protrusions has at least two friction protrusion portions, and the friction protrusion portions have different edge widths or different curvatures.

7. The knob assembly of claim 6, wherein in the friction protrusion portions, at least one of a center frequency, a frequency band, and a peak value generates different friction sounds according to the edge width or the curvature.

8. A knob assembly, comprising:
   a fixing member comprising at least one friction protrusion; and
   a body, the body comprising
   a head portion,
   a cylindrical-shaped protruding portion protruding from one surface of the head portion, the protruding portion interlocked with and configured to rotate together with the head portion; and
   a plurality of body friction protrusions disposed along an exterior circumference of the protruding portion and configured to generate friction sound patterns by sequentially rubbing the friction protrusion of the fixing member as the head portion rotates,
   the body friction protrusions each having an edge shape such that the friction sound patterns vary according to a rotation direction of the head portion.

9. The knob assembly of claim 8, wherein the protruding portion is inserted into a penetration hole of a display and is coupled to the fixing member to rotate relative to the fixing member, and the fixing member is fixed to the display to prevent the protruding portion from separating from the penetration hole.

10. The knob assembly of claim 8, wherein, in the plurality of body friction protrusions, at least one of a center frequency, a frequency band, and a peak value generates different friction sounds according to the edge shape.

11. A knob control system for a vehicle, the knob control system comprising:

a knob comprising a head portion and a plurality of first friction protrusions that generate at least one friction sound pattern according to a rotation direction of the head portion;

an audio sensor; and a controller configured to detect a rotation direction and a rotation amount of the head portion by analyzing the at least one friction sound pattern that is detected through the audio sensor and to recognize a control input based on the rotation direction and the rotation amount.

12. The knob control system of claim 11, wherein the first friction protrusions have edges shaped such that the at least one friction sound pattern varies according to a rotation direction of the head portion.

13. The knob control system of claim 12, wherein the controller detects an order in which the plurality of first friction protrusions generate friction sounds by analyzing the at least one friction sound pattern and detects the rotation direction based on the order.

14. The knob control system of claim 12, wherein the controller detects a peak value from the at least one friction sound pattern and detects the rotation amount according to a detection number of the peak value.

15. The knob control system of claim 12, wherein the knob further comprises a cylindrical-shaped protruding portion protruding from one surface of the head portion, the protruding portion interlocked with and configured to rotate together with the head portion, and the plurality of first friction protrusions are disposed along an exterior circumference of the protruding portion.

16. The knob control system of claim 15, further comprising a display comprising a second friction protrusion, wherein the second friction protrusion generates the at least one friction sound pattern by sequentially rubbing the first friction protrusions as the head portion rotates.

17. The knob control system of claim 16, wherein the knob further comprises a fixing member that is coupled to the protruding portion in an opposite direction of the head portion, the protruding portion is inserted into a penetration hole of the display, and the fixing member prevents the protruding portion from separating from the penetration hole.

18. The knob control system of claim 17, wherein the second friction protrusion is formed at an interior circumference of the penetration hole.

19. The knob control system of claim 15, wherein the knob further comprises a fixing member comprising a second friction protrusion, and the plurality of first friction protrusions generate the at least one friction sound pattern by sequentially rubbing the second friction protrusions as the head rotates.

20. The knob control system of claim 19, further comprising a display comprising a penetration hole, wherein the protruding portion is inserted into the penetration hole and is coupled to the fixing member and configured to rotate relative to the fixing member, and the fixing member is fixed to the display to prevent the protruding portion from separating from the penetration hole.

* * * * *